United States Patent [19]

Bishop

[11] Patent Number: 4,664,153
[45] Date of Patent: May 12, 1987

[54] QUICK CONNECTOR FOR PLASTIC TIRE VALVE EXTENSIONS

[75] Inventor: William V. Bishop, Durham, N.C.

[73] Assignee: Eaton Corporation, Cleveland, Ohio

[21] Appl. No.: 845,310

[22] Filed: Mar. 28, 1986

[51] Int. Cl.⁴ .............................................. F16K 15/20
[52] U.S. Cl. ................................... 137/798; 137/223; 137/231
[58] Field of Search ....................... 137/223, 231, 798; 285/322, 323

[56] References Cited

U.S. PATENT DOCUMENTS 1,297,719  3/1919  Myers ............................. 285/322 X
2,141,033 12/1938  Crowley ............................... 137/231
3,232,648  2/1966  Franck ............................. 385/322 X
3,508,572  4/1970  Paffrath ............................... 137/231
4,103,941  8/1978  Stoll ................................. 285/322 X Primary Examiner—Harold W. Weakley
Attorney, Agent, or Firm—D. A. Rowe; C. J. Toddy

[57] ABSTRACT

An improved air chuck for tire valves having a plurality of teeth which positively lock the chuck to the valve stem by a plurality of closely spaced radially inwardly projecting fingers which are moved into engagement with the valve stem by sliding a sleeve member over the fingers. The chuck includes a means for depressing the tire valve pin and a means for sealing the outer end of the valve when the chuck is engaged.

5 Claims, 4 Drawing Figures

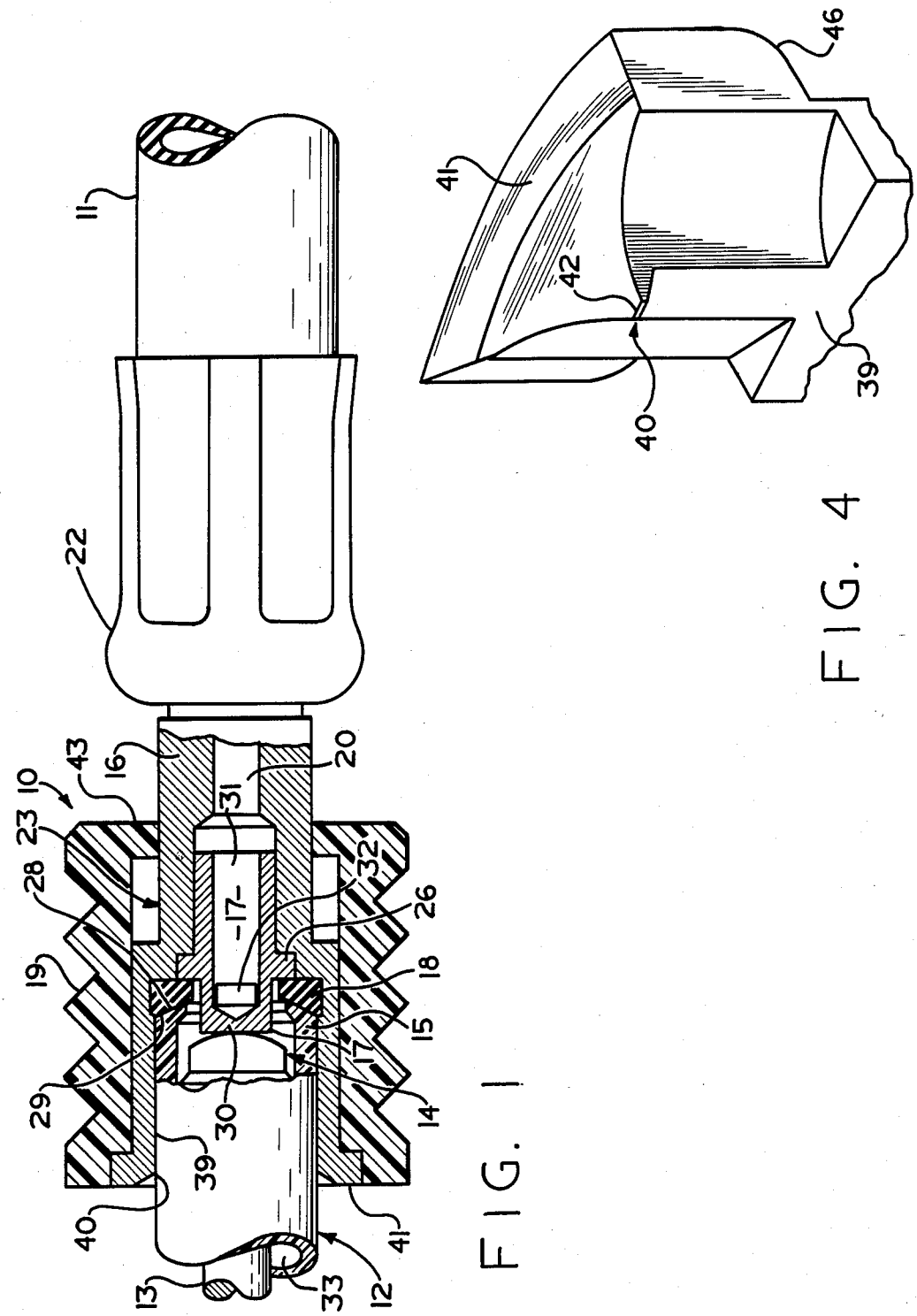

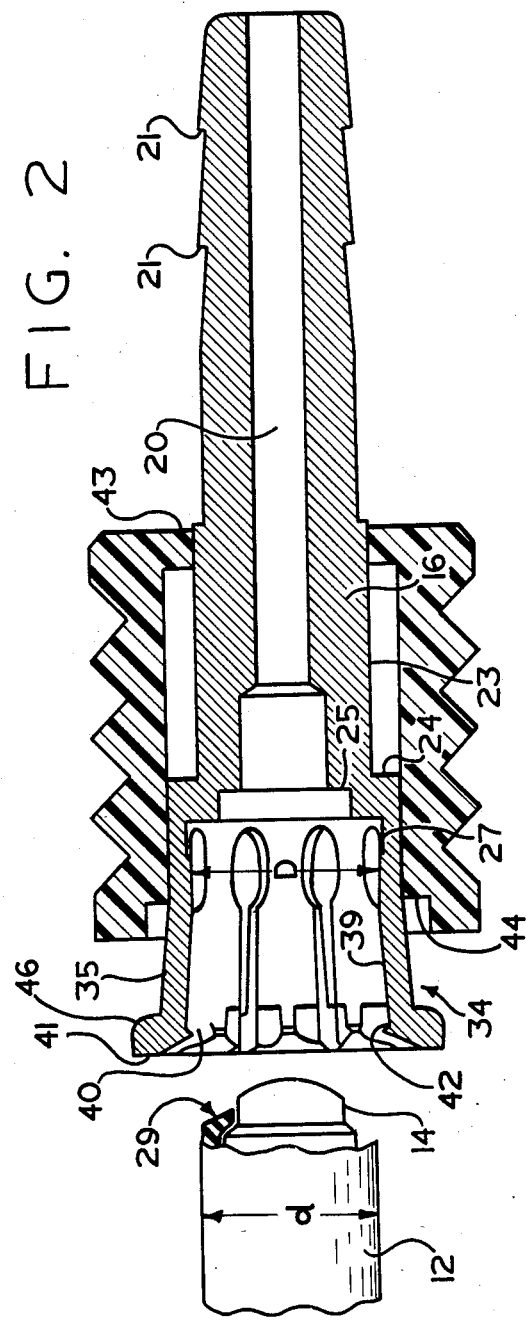

QUICK CONNECTOR FOR PLASTIC TIRE VALVE EXTENSIONS

This invention relates to an air chuck for connecting an air supply line to a tire valve stem or tire valve extension which are made of plastic. And more particularly to air chucks constructed to grip and detachably lock on to a plastic valve stem during the air inflating operation.

An object of the present invention is to provide an air supply line chuck of the character described which may be readily, conveniently and rapidly applied to a plastic tire valve stem or plastic tire valve extension with ease and precision and which when applied will grip the valve stem with a constant predetermined and uniformly distributed pressure to ensure a positive locking of the chuck to the stem without distortion or otherwise injuring the plastic tire valve stem or extension.

Another object of the invention is to provide an air supply line chuck of the character described which is simplified and economical to manufacture and assemble and nevertheless lightweight, compact and trouble free well adapted for use under rugged service conditions.

With these objects in view, reference is made to the following description taken in connection with the accompanying drawings wherein:

FIG. 1, is a longitudinal cross-sectional view with parts broken away, showing the air chuck in positive clamping position.

FIG. 2, is a partial longitudinal cross-sectional view through the coupler body in the unclamped position.

FIG. 3, is a side view of the coupler body.

FIG. 4, is an enlarged isometric view of the end of a finger of the coupler body.

The air chuck of the present invention, generally referred to by the numeral 10, is adapted to provide an operating connection between a supply line 11 and a tire valve stem or extension 12. The stem or extension 12 is made of plastic such as nylon, or a fairly hard plastic material, and the end of the stem or extension 12 is not provided with threads. The unthreaded stem 12 is provided with a tire valve (not shown) having a pin 13 extending therefrom which is depressed, as shown in FIG. 1, to open the tire valve for the admission of air. When the tire valve is closed, the head 14 of the valve pin 13 projects a short distance beyond the end 15 of the valve stem or extension 12.

The air chuck assembly 10 includes a body member 16, a depresser pin 17, an elastomeric washer seal 18 and a plastic sleeve actuator 19. The body member 16 is made of metal, preferably brass and is of generally tubular form having an axially passageway 20 which communicates with the air supply line 11. The body member 16 has a pair of shoulders 21 which project into the passageway of the supply line 11. The body member 16 is secured to the supply line 11 by suitable means such as a ferrule 22.

The cylindrical central portion 23 of the body member 16 has an external annular shoulder 24 and an internal annular shoulder 25 which mates with a annular external flange 26 formed on the depressor pin 17. The depressor pin is held in position by the washer seal 18 which fits into an annular groove seat 27 formed in the body member 16. The washer seal 18 is provided with a conically shaped base 28 which seals coextensively with a corresponding conical face 29 on the end 15 of the valve stem. The end 30 of the depressor pin 17 projects beyond the seat 27 so that the head 14 of the valve pin 13 is depressed prior to axially engagement of the faces 28 and 29. Air is communicated from the passageway 20 through the axially passageway 31 formed in the depressor pin 17 and hence through one or more orifices 32 extending radially through the end 17 from the orifices 32 air passes past the washer seal 18 and hence into the passageway 33 of the tire valve stem 12.

The other end 34 the body is formed of a plurality of fingers 35 each of which extends circumferentially for a substantially greater distance than the slots or spacing 36 between each of the fingers. The base 37 of each slot 36 are widened and curvilinear in shape. Thus, the inner portion 38 of each of the fingers is circumferentially narrowed and therefore more flexible than the remainder of each finger.

For purposes of clearly showing th construction of the fingers 35 of the body member 16, the depressor pin 17 and washer seal 18 are not shown in FIG. 2. As shown in FIG. 2, in the normal expanded position of the fingers, the inner surface 39 of each finger diverges radially outwardly so that the teeth 40 are each positioned at a diameter greater than the external diameter of the valve stem 12, which is slightly smaller than the internal diameter d of the fingers 35.

As shown in FIG. 4, each of the teeth 40 project radially inwardly from the inner surface 39 and are located axially inwardly from the face 41 of the fingers. Moreover, the working face 42 of each tooth 40 is substantially rectilinear in shape and of very small surface area. The working faces 42 are circumferentially spaced from each other for a distance greater than several times the circumferential dimension of the working face 42. Also, each working face 42 extends radially from the inner surface 39 for a very small distance, preferably approximately 0.025 inches.

The sleeve actuator 19 is of generally cylindrical shape and is preferably made of a suitable plastic, such as Delrin. The internal diameter of the sleeve 19 is slightly larger than the outside diameter of the body member 16 in the area of the seal seat 27 and is provided with a radially inwardly extending annular flange 43 having a hole therein which has a diameter slightly larger than the central portion 23 of the body member 16. The front end of the actuator 19 is provided with an annular face 44.

In applying the check to a tire valve stem or extension, the sleeve 19 is manually pulled toward the ferrule 22, into the position shown in FIG. 2, so that flange 43 is adjacent the ferrule 22 and the internal surface of the actuator 19, adjacent the base 44, surrounds the base 38 of each of the fingers 35. In this position, working face 42 of each of the fingers 35 are positioned at a diameter larger than the diameter d of the stem 12. The assembly 10 is then moved axially toward and over the stem or extension 12 until the head 14 of the valve pin 13 engages the depressor pin 17 and the face 29 of the stem 12 engages the face 28 of the washer seal 18. With the pin head 14 depressed and the seal between the surfaces 28 and 29 engaged, the sleeve actuator 19 is manually moved axially to the left of FIG. 2, in to the position shown in FIG. 1, so that the flange 44 engages the shoulders 46 on each of the fingers 35. With the sleeve actuator 19 moved into the position shown in FIG. 1, all of the fingers are radially inwardly contracted with the surface 39 abutting the outer surface of the valve stem 12. The working face 42 of all of the teeth 40 are depressed into the surface of the unthreaded plastic valve stem or extension 12. Thus, the chuck assembly is positively locked to the valve stem 12. In this position, the internal surfaces 39 of each of the fingers 35 abutt the external surface of the stem 12. Since the valve 10 is depressed by the depressor pin 17 and a seal is made between the faces 28 and 29, air may be injected from the supply line 11, through the passageway 20, through the radially extending orifice 32 and, then, through the passageway 33 into the tire.

After the tire is filled, the chuck assembly 10 may be removed from the stem 12 by manually retracting the sleeve actuator 19 into the position shown in FIG. 2, and the chuck assembly removed. In the detached position the resiliency of the fingers 35 causes the fingers to move radially outwardly into the position shown in FIG. 2.

I claim:

1. An air supply line chuck for a tubular plastic tire valve stem having an open end with an unthreaded external surface and an internal axially displaceable valve core comprising a tubular coupler body having an end connected to said supply line;

said body having a depressor pin intermediate the ends of said body for depressing said valve core and a rubberring shaped member for engaging and sealing the end of said valve stem, said pin projecting beyond said member, a passageway extending through said body and pin which communicates between said supply line and said valve stem the opposite end of said coupler body formed of a plurality of closed spaced resilient metal fingers, each finger having a radially inwardly projecting tooth at the outer end thereof, said fingers projecting axially at an angle to the axis of said body so that said teeth are resilently biased radially outwardly of the outer surface of the valve stem, and the inner end of said fingers having an internal diameter approximately equal to the external diameter of the valve stem, an actuating sleeve slidably movable axially on said tubular body toward the outer end of said fingers for moving said fingers radially inwardly against the bias thereof into a contracted position so that said teeth embed into the external surface of said valve stem and the radially inner surface of said fingers abutt against the external surface of the valve stem to thereby lock the body onto the valve stem.

2. An air chuck as claimed in claim 1 in which each tooth extends radially beyond the radially inner surface of each finger a distance substantially less than the thickness of the fingers.

3. An air chuck as claimed in claim 1 in which said rubber member is positioned in an annular grooved seat located at the base of said fingers.

4. An air chuck as claimed in claim 3 in which the depressor pin is a discrete part and provided with an annular flange engaged by said rubber member to hold said pin in position.

5. An air chuck as claimed in claim 1 in which said depressor pin is tubular in shape and provided with a blind end, said passage extending radially adjacent said blind end.

* * * * *